Figure 4B:
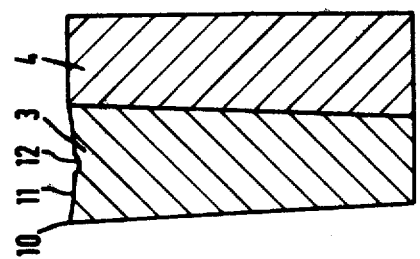

United States Patent [19]

Kemmer

[11] 4,357,847
[45] Nov. 9, 1982

[54] MULTIPLE-BLADE SYSTEM AS A TURNING TOOL FOR THE CUTTING MACHINING OF WORKPIECES

[76] Inventor: Klaus H. Kemmer, Am Gansberg 31, 7277 Wildberg 4, Fed. Rep. of Germany

[21] Appl. No.: 166,516

[22] Filed: Jul. 7, 1980

[30] Foreign Application Priority Data

Jul. 17, 1979 [DE] Fed. Rep. of Germany ... 7920363[U]
Oct. 6, 1979 [DE] Fed. Rep. of Germany ....... 2940549

[51] Int. Cl.³ .......................... B26D 1/04; B26D 3/02
[52] U.S. Cl. .................................... 82/36 R; 407/71; 407/117
[58] Field of Search .................. 82/36 R; 407/70, 71, 407/117

[56] References Cited

U.S. PATENT DOCUMENTS

| 662,492 | 11/1900 | Mingst | 407/117 |
|---|---|---|---|
| 1,835,958 | 12/1931 | Luers | 82/36 R X |
| 2,289,155 | 7/1942 | Weidauer | 82/36 R X |
| 2,333,021 | 10/1943 | Lipani | 407/71 |
| 2,688,791 | 9/1954 | Luers et al. | 407/117 |
| 2,861,322 | 11/1958 | Benes et al. | 82/36 R |
| 3,152,386 | 10/1964 | Robbins | 407/117 |
| 3,455,002 | 7/1969 | Miller | 407/70 |
| 3,596,337 | 8/1971 | Arnold et al. | 407/117 |
| 3,662,445 | 5/1972 | Whitaker | 407/71 |
| 3,675,291 | 7/1972 | Girardin | 407/71 |

FOREIGN PATENT DOCUMENTS 617343  8/1935  Fed. Rep. of Germany ..... 82/36 R

Primary Examiner—Leonidas Vlachos
Assistant Examiner—Jerry Kearns
Attorney, Agent, or Firm—Sughrue, Mion, Zinn, Macpeak & Seas

[57] ABSTRACT

A multi-bladed tool system for use with automatic bar lathes and screw machines is disclosed. Parting and chamfering blades are claimed in an elongated holder in predetermined spaced relationship according to intended workpiece configuration by spacer elements and a set screw driven clamping jaw. The blades may extend through the length of the holder so that both ends of the blades may be used by reversing the holder. The blades are trapezoidal in cross section to provide for adequate transmission of clamping forces to all the blades.

8 Claims, 16 Drawing Figures

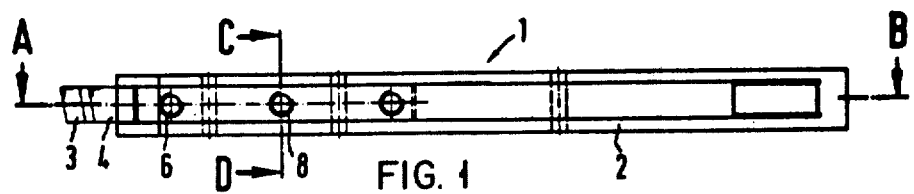
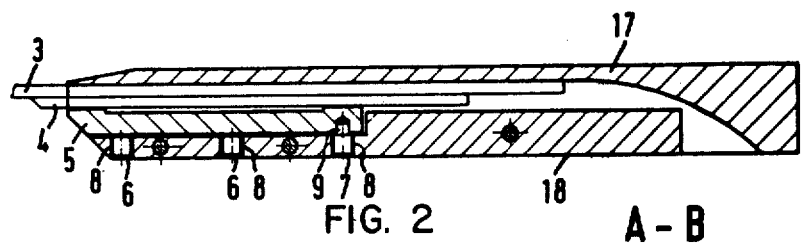
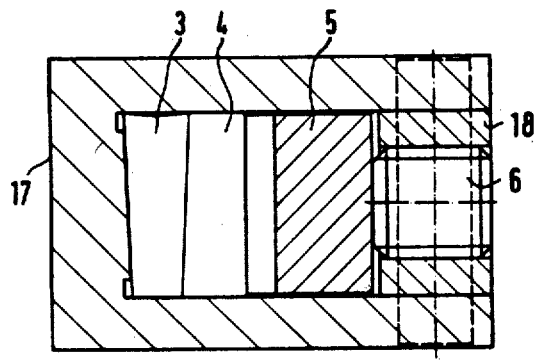

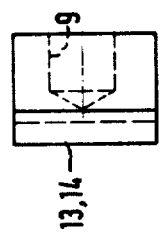
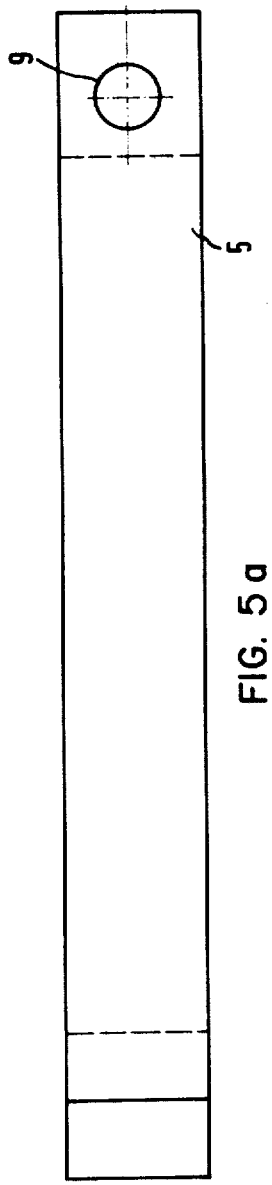
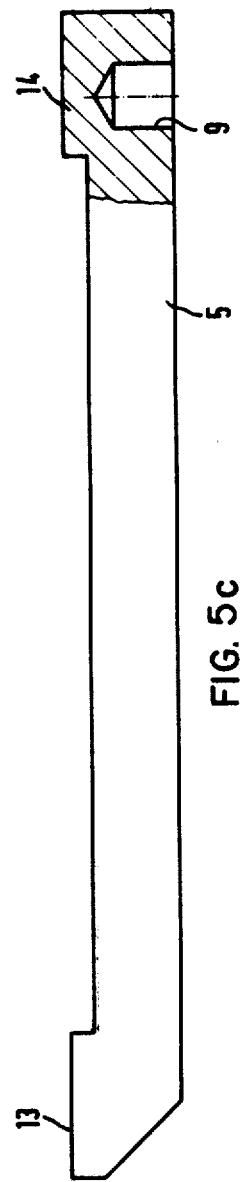

MULTIPLE-BLADE SYSTEM AS A TURNING TOOL FOR THE CUTTING MACHINING OF WORKPIECES

The invention relates to a multiple-blade system as a turning tool for the cutting machining of workpieces, comprising a sleeve and blades which can be clamped therein, in particular for parting and/or chamfering workpieces in long-turning automatic lathes or screw turning machines and single-spindle and multi-spindle automatic bar machines.

The use of tools for the cutting machining of workpieces on turning lathes is known, in many different forms. For example, clamping devices into which cutting blades or tools can be clamped by clamping holders are widely known. The cutting blades or tools in such arrangements usually comprise for example high-speed steel (HSS) with a Rockwell hardness of $\geq 60$.

Also known (see applicant's German Gebrauchsmuster 79.07.326, filed Mar. 3, 1979 and published June 28, 1979) is a clamping means for turning tools, preferably for blades, which is distinguished in that a solid shank or stem of square configuration is provided at one end, for receiving a blade, with a sleeve of which one side surface has threaded through bores with clamp screws screwed therein for securing the blade which forms the actual tool in the sleeve in the longitudinal direction of the shank.

This clamping means is particularly suitable for use on long-turning automatic lathes or screw turning machines or single-spindle and multi-spindle automatic bar machines, which hitherto used so-called square turning blades of high-speed steel.

The present invention now seeks to enlarge this turning tool which comprises a clamping means and a blade clamped therein, to a multiple-blade system which can be employed and used in a substantially greater number of ways.

According to the invention, this is achieved in that a clamping jaw is releasably fitted in at least one end portion of the sleeve, but preferably also in both end portions of the sleeve and that the actual tool comprises at least one and preferably two blades or more, and that the blade or blades can be pressed, by means of clamp screws which are disposed in threaded bores in a wall of the sleeve and which engage the clamping jaw, against the oppositely disposed inside wall of the sleeve.

The arrangement is advantageously such that the clamping jaw or jaws is or are prevented from sliding out of the sleeve by means of a screw fitted into the outside wall of the sleeve, and that on the one hand said screw is guided in a threaded bore in the outside wall of the sleeve and on the other hand is inserted into a blind bore in the clamping jaw.

It is to be considered as particularly advantageous for the actual tool to comprise a plurality of blades, the cutting edges of which are displaced relative to each other by a predetermined amount, and for a more forwardly projecting blade to serve as a parting blade and for a further inwardly disposed blade to serve as a chamfering blade.

When using a plurality of blades, for example up to eight blades, the following working operations can be carried out therewith: edge bevelling, chamfering profiling, grooving or recessing and also simultaneous multiple grooving or recessing, if individual blades are used only as spacer blades.

Figure 4A:
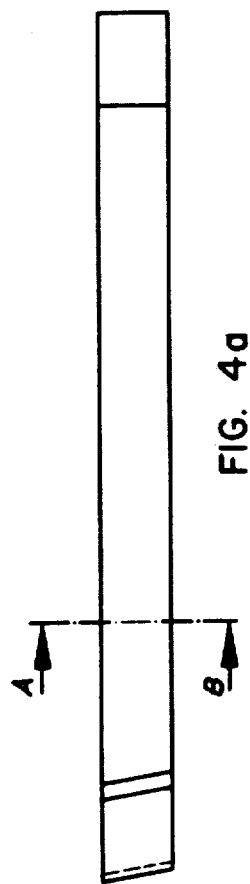
Figure 4C:
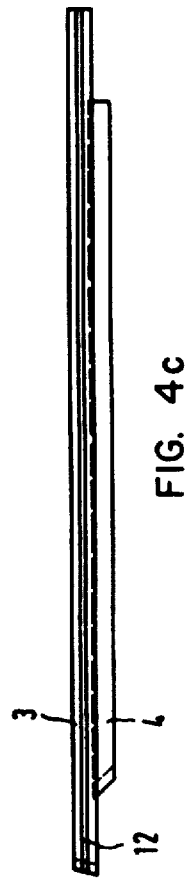
Figure 6B:
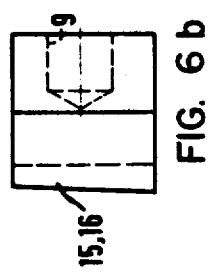
Figure 6A:
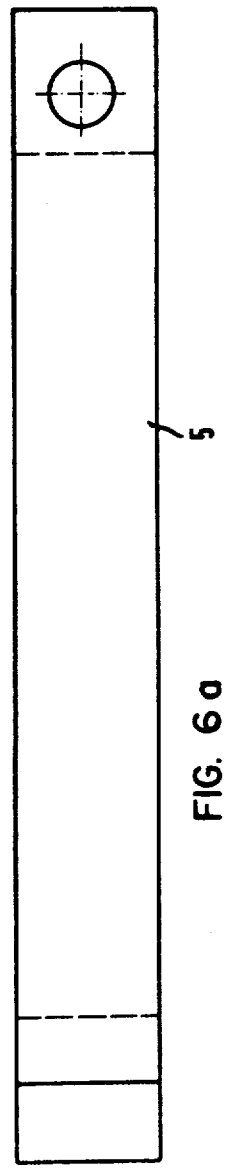
Figure 6C:
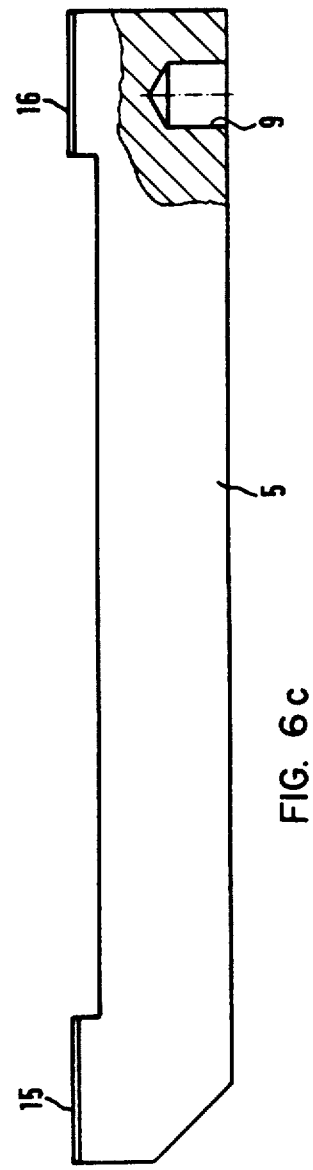

The invention is now described in greater detail with reference to embodiments, in conjunction with the accompanying drawings in which:

FIG. 1 shows a plan view of a simple embodiment of the novel turning tool according to the invention, FIG. 2 shows a view of the novel turning tool in section taken along line A-B in FIG. 1, FIG. 3 shows a view of the novel turning tool in cross-section taken along line C-D in FIG. 1, FIG. 4a shows a plan view of a pair of blades, FIG. 4b shows a view of an enlarged scale of the pair of blades in section taken along line A-B in FIG. 4a, FIG. 4c shows a plan view of a pair of blades, FIGS. 5a, 5b and 5c show a plan view, a side view and a sectional view of a clamping jaw for a pair of blades, FIGS. 6a, 6b and 6c show the same views of a modified clamping jaw for a single blade.

Figure 7:
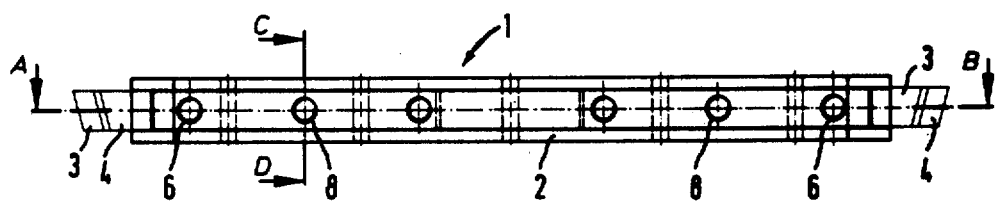
Figure 8:
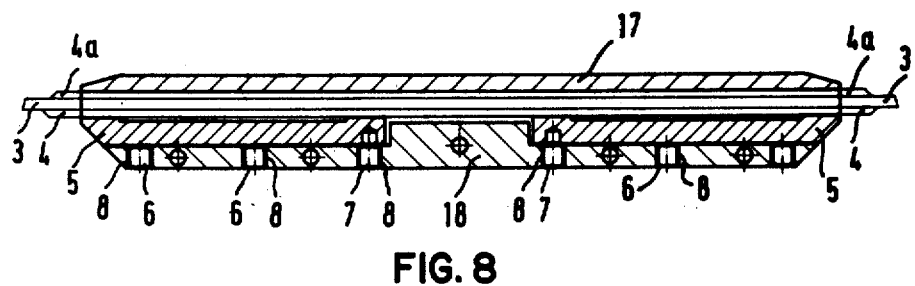
Figure 9:
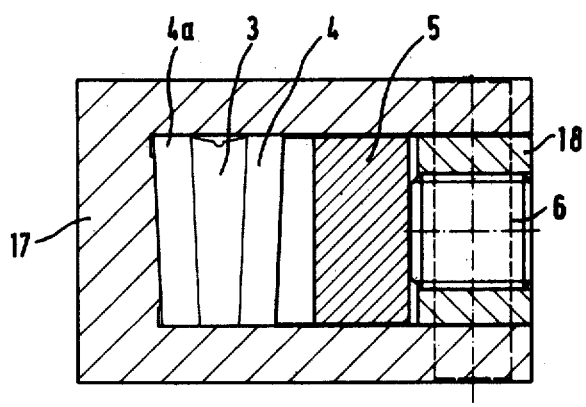
Figure 8A:
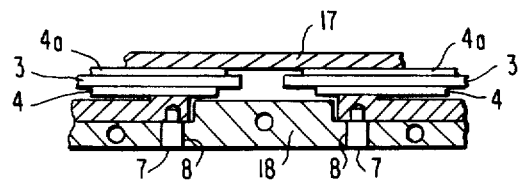

FIG. 7 shows a preferred embodiment with clamping jaws provided at both ends of the sleeve, and three blades, FIG. 8 shows a view in section taken along line A-B in FIG. 7, FIG. 8a shows a variation of FIG. 8, and FIG. 9 shows a view in section taken along line C-D in FIG. 7.

FIG. 1 shows a plan view, partly in phantom, of a simple embodiment of a turning tool 1 in accordance with the invention. The tool 1 comprises a clamping sleeve 2 into which initially two blades 3 and 4 can be fitted, the blade 3 being for example a parting blade and the blade 4 being for example a chamfering blade. As can be seen particularly clearly from FIGS. 2 and 3, the tool includes a clamping jaw 5 which can be pressed against the blades 3 and 4, which can be inserted into the sleeve in the longitudinal direction, by means of clamp screws 6 and by a screw 7 which serves at the same time as a jaw-holding screw. The clamp screws 6 and the holding screw 7 in this arrangement are screwed in threaded bores 8 in an outside wall of the sleeve. However, the holding screw 7 extends beyond the inside wall surface of the sleeve and engages into a blind hole 9 provided in the clamping jaw 5 at the rearward end. The clamping jaw 5 can then be removed by screwing out the screw 7. For the purposes of clamping the blades, the clamp screws 6 and the holding screw 7 can be tightened until the pair of blades is firmly fixed in position.

As can be seen in particular from FIG. 3, the two blades are each of approximately trapezoidal cross-section in such a way that the contact surface of one of the blades, which is disposed opposite the clamping jaw, lies parallel to the contact surfaces 13 and 14 of the clamping jaw, such surfaces moreover being clearly shown in FIGS. 2 and 5c. It will be seen therefrom that the clamping jaw actually lies against the one blade only with the two contact surfaces 13 and 14, which has been found particularly advantageous for clamping the blades. It will also be seen from FIG. 3 and in addition also from FIG. 4b that the cutting edge 10 of the parting blade is arcuately ground at 11, with a groove 12 extending in the longitudinal direction of the blade being disposed in the ground portion. FIG. 4b also shows the cross-section of the two blades.

FIGS. 5a, b and c show all the details of the design of a clamping jaw 5 for two blades. The figures in particular show the blind hole fixing means, and also the two contact surfaces 14 and 13.

In the event that only one blade of trapezoidal cross-section is to be used, the arrangement employs a somewhat modified clamping jaw 5a, the bevelled or inclined contact surfaces 15 and 16 of which are shown in particular in FIGS. 6a, 6b and 6c. This then permits a single blade to be clamped in an equally simple manner.

Finally, it should also be mentioned that the sleeve 2 shown in FIG. 2 could, in itself, be made in one piece, but that, for reasons of precision manufacture, it comprises a portion 17 of U-shaped cross-section and an insert portion 18 which is seamlessly or weldlessly fitted into the portion 17 and which, after being fitted therein, is non-releasably and fixedly connected to the portion of U-shaped cross-section, preferably by a suitable hardenable adhesive or by hard soldering or brazing, or in a manner giving a similar effect.

FIGS. 1 and 2 also show that, at its rearward end, the sleeve has a viewing opening which was produced in the manufacturing process by broaching.

This novel tool makes it possible for the first time for both one blade and also in particular and preferably a plurality of blades to be used simultaneously, in such a way that the cutting edges of the blades are at a predetermined distance from each other so that, for example when there are two blades, the more forwardly projecting blade is used for parting a workpiece and the further inwardly disposed blade is used for chamfering the workpiece which has just been parted.

Machining of this kind was not possible with the previously known turning tools.

In this connection, it is of quite particular advantage, with two blades of this kind, for the parting blade to be provided at its cutting edge with an arcuately ground portion 11 and a groove 12 which extends in the longitudinal direction, as a substantially smaller amount of heat is produced, by virtue of this arrangement, due to deformation of the chip as it comes away.

FIG. 7 shows a preferred embodiment of the novel multiple-blade system according to the invention. Although only three blades are shown herein, by way of example, if the internal dimensions of the sleeve are suitably altered, a substantially greater number of blades can be fitted and used, with blades on both sides of the sleeve at the same time. The number of blades need not be the same on both sides, and blades which are not required can also be replaced by spacer members.

In other respects, the same components are denoted by the same reference numerals.

FIGS. 7, 8, 8a and 9 show a particularly preferred embodiment of the invention, with clamping jaws provided at both ends of the sleeve, and for example three blades. If the dimensions are suitably altered, even more blades, for example up to eight blades, can then be simultaneously clamped on each side. The drawing shows the blades 3, 4 and 4a which are fitted on both sides (FIG. 8a) of the clamping sleeve 2 or which are continuous (FIG. 8), and which are clamped in position by means of the two clamping jaws 5, by way of clamp screws 6 and the screw 7 which serves as a holder. In other respects, the construction is identical to that shown in FIGS. 1 to 3. FIG. 9 also shows the manner in which for example the three blades 3, 4 and 4a are clamped in position.

By virtue of this configuration according to the invention, with blades which extend through the entire sleeve and which project out at both ends, the result is a tool which can be used both for clockwise rotation and for anti-clockwise rotation. This therefore avoids the need for a further tool.

As already mentioned, when suitably disposing a plurality of blades which must certainly not be provided in the same numbers and strength on the two different sides of the tool, a plurality of operations can be carried out simultaneously on one and the same workpiece, such as for example edge bevelling, chamfering, profiling and grooving, and in particular simultaneous multiple grooving, if individual blades which are disposed between the grooving blades are fitted only as spacer blades. The spacer blades can also be replaced by simple spacer members, but these must be of such a length that the projecting blades which are used for the cutting machining operation remain vibration-free as far as possible.

The present invention thus provides a multiple-blade system as a turning tool for the cutting machining of workpieces, which is distinguished by a hitherto unknown, extraordinary multiplicity of possible uses.

I claim:

1. A turning tool for the cutting machining of workpieces and of the type to be mounted in a tool holder, comprising:

a hollow sleeve of substantially rectangular cross-section and having oppositely disposed walls and opposite end portions;

a clamping jaw releasably fitted in at least one of said end portions of said sleeve;

a first cutting blade clamped between said releasably fitted jaw and one of said opposite walls;

adjustable clamping screw means, threaded in threaded bores in the other of said opposite walls, for engaging said clamping jaw and causing the jaw to press said blade against said one wall; and at least a second cutting blade, which forms with said first blade a plurality of blades forming the actual tool, the cutting edges of said blades being displaced relative to each other by a predetermined amount so that the more forwardly projecting blade serves as a parting blade and the more inwardly disposed blade serves as a chamfering blade;

the blades being of approximately trapezoidal cross-section so that the contact surface of one of the blades lies against the clamping jaw parallel to the longitudinal axis of the sleeve;

the cross-section of the chamfering blade being narrower at the cutting side than at the opposite side and extending parallel thereto.

2. A turning tool as defined in claim 1 and further comprising screw means for preventing said clamping jaw from sliding out of said sleeve, said screw means being fitted into one of said walls of said sleeve and, on the one hand, being guided in a threaded bore in said one wall and, on the other hand, being inserted into a blind bore in said clamping jaw.

3. A tool according to claim 2 characterised in that the sleeve comprises a portion of U-shaped cross-section and an insert member which is fitted therein and which is non-releasably connected thereto and which is provided with threaded through bores for receiving the screw and clamping screw means for securing the clamping jaw and for pressing the clamping jaw (5) against the blades.

4. A tool according to claims 1 or 2 characterised in that the clamping jaw is interchangeable for the purposes of adaptation to different blade configurations.

5. A tool according to claim 1 or 2 characterised in that the cross-section of the parting blade (3) is wider at the cutting side than at the opposite side, and that the cutting edge (10) is ground in an arcuately concave configuration and has a longitudinal groove of approximately quarter circle shape.

6. A tool according to claims 1 and 2 characterised in that the clamping jaw has respective blade contact surfaces only at its forward and its rearward end.

7. A tool according to claim 1 or 2 further comprising:

a second clamping jaw releasably fitted in the other of said end portions of said sleeve;

a third cutting blade being clamped between said second jaw and said one of said opposite walls; and second adjustable clamping screw means, threaded in threaded bores in the other of said opposite walls, for engaging said second clamping jaw and causing it to press said third blade against said one wall.

8. A tool according to claim 7 further comprising at least a fourth blade adjacent said third blade and forming a second plurality of blades, the cutting edges of the blades forming said second plurality of blades being displaced relative to each other by a predetermined amount, and the more forwardly projecting blade of said second plurality serving as a parting blade and the further inwardly disposed blade serving as a chamfering blade.

* * * * *